(12) United States Patent
Woods et al.

(10) Patent No.: US 9,119,038 B2
(45) Date of Patent: Aug. 25, 2015

(54) SYSTEMS AND METHODS FOR COMPARATIVE GEOFENCING

(71) Applicant: Yopima LLC., Atlanta, GA (US)

(72) Inventors: Vernell Woods, Atlanta, GA (US);
Dennis Campbell, Atlanta, GA (US);
Troy Nunnally, Atlanta, GA (US);
Travis Nunnally, Atlanta, GA (US);
Alexander Mims, Atlanta, GA (US)

(73) Assignee: Yopima LLC, Atlanta, GA (US)

( * ) Notice: Subject to any disclaimer, the term of this patent is extended or adjusted under 35 U.S.C. 154(b) by 280 days.

(21) Appl. No.: 13/899,348

(22) Filed: May 21, 2013

(65) Prior Publication Data

US 2014/0351328 A1    Nov. 27, 2014

(51) Int. Cl.
*G06F 15/16* (2006.01)
*H04W 4/02* (2009.01)
*H04L 29/08* (2006.01)

(52) U.S. Cl.
CPC .............. *H04W 4/028* (2013.01); *H04W 4/021* (2013.01); *H04L 67/18* (2013.01)

(58) Field of Classification Search
USPC .............. 709/204; 455/456.3, 456.1; 701/465
See application file for complete search history.

(56) References Cited

U.S. PATENT DOCUMENTS

| | | | |
|---|---|---|---|
| 8,977,296 B1* | 3/2015 | Briggs et al. | 455/456.3 |
| 2013/0103307 A1* | 4/2013 | Sartipi et al. | 701/465 |

* cited by examiner

*Primary Examiner* — Kyung H Shin
(74) *Attorney, Agent, or Firm* — Foley and Lardner LLP; John D. Lanza

(57) ABSTRACT

The present disclosure describes systems and methods for time-based geolocation queries, with designated planned arrival and/or departure times or event start/end times. The number of queries can be drastically reduced to reduce battery, bandwidth, and processing requirements; or the rate of queries can be increased within a specified time frame, providing much higher resolution of geolocation information. Geolocation information may be monitored via notifications from portable devices to identify demographics of users within identified regions and subregions, allowing real-time, dynamic comparison of demographic information between locations, such as restaurants, clubs, or events.

20 Claims, 13 Drawing Sheets

| Location | Users present | Gender ratio | Average Age |
|---|---|---|---|
| Geofence B 400B | 3 | 2:1 | 23 |
| Geofence C 400C | 4 | 1:1 | 32 |
| Geofence D 400D | 2 | 1:0 | 25 |

SYSTEMS AND METHODS FOR COMPARATIVE GEOFENCING

FIELD

The present application relates to systems and methods for geolocation and user tracking. Specifically, the present application relates to tracking locations of a plurality of devices within overlapping geofences and comparing demographics of users of the devices.

BACKGROUND

Many portable electronic or computing devices, such as smart phones, tablets, laptops, or other such devices, include geolocation capabilities or functionality for locating the device (and presumably the user of the device) on a map. Such capabilities may include global positioning system (GPS) receivers, cellular signal receivers, WiFi receivers, etc. In many embodiments, these devices may transmit queries to a location service provider, such as queries including identifiers of cellular or WiFi transmitters that the device can detect and/or signal strengths or timing information. The location service provider may determine, via triangulation, signal databases, or other means, a set of geographic coordinates of the device, and may, in many instances, transmit the coordinates to the device for display on a map or other uses.

SUMMARY

The present disclosure describes systems and methods for time-based geolocation queries, with designated planned arrival and/or departure times or event start/end times. The number of queries can be drastically reduced to reduce battery, bandwidth, and processing requirements; or the rate of queries can be increased within a specified time frame, providing much higher resolution of geolocation information. Geolocation information may be monitored via notifications from portable devices to identify demographics of users within identified regions and subregions, allowing real-time, dynamic comparison of demographic information between locations, such as restaurants, clubs, or events.

In one aspect, the present disclosure is directed to a method for time-based geofencing. The method includes receiving, by a portable computing device, an identification of a region and a planned arrival time. The method also includes identifying, by the portable computing device, that a current time is within a predetermined period of time before the planned arrival time. The method further includes responsive to the identification, determining a current location of the portable computing device. The method also includes comparing the current location of the portable computing device to the identified region. The method further includes repeating the steps of determining the current location of the portable computing device and comparing the current location of the portable computing device to the identified region at a predetermined frequency, responsive to determining that the current location of the portable computing device is outside of the identified region.

In one embodiment, the method includes transmitting, by the portable computing device to a second computing device, an arrival notification, responsive to determining that the current location of the portable computing device is within the identified region. In a further embodiment, the method includes transmitting a user identification to the second computing device. In another further embodiment, the method includes disabling determining a current location of the portable computing device, responsive to determining that the current location of the portable computing device is within the identified region. In yet another further embodiment, the method includes repeating the steps of determining the current location of the portable computing device and comparing the current location of the portable computing device to the identified region at a second predetermined frequency responsive to determining that the current location of the portable computing device is inside of the identified region. In a still further embodiment, the method includes transmitting, by the portable computing device to the second computing device, a departure notification, responsive to determining that the current location of the portable computing device is not within the identified region.

In some embodiments, the method includes disabling determining a current location of the portable computing device, responsive to identifying that a current time is more than a predetermined period of time after the planned arrival time. In other embodiments, the method includes disabling determining a current location of the portable computing device prior to the predetermined period of time before the planned arrival time. In still other embodiments, the method includes transmitting a location query to a location service executed by the second computing device or a third computing device. In yet other embodiments, the method includes transmitting an identification of the current location of the portable computing device to the second computing device or a third computing device; and receiving from said second computing device or third computing device an identification of whether or not the portable computing device is within the identified region.

In another aspect, the present disclosure is directed to a system for time-based geofencing. The system includes a portable computing device, and a clock of a current time maintained by the portable computing device. The portable computing device executes a location engine. The location engine is configured for receiving an identification of a region and a planned arrival time, and identifying that the current time is within a predetermined period of time before the planned arrival time. Responsive to the identification, the location engine determines a current location of the portable computing device, and compares the current location of the portable computing device to the identified region. The location engine is configured for repeating the steps of determining the current location of the portable computing device and comparing the current location of the portable computing device to the identified region at a predetermined frequency, responsive to determining that the current location of the portable computing device is outside of the identified region.

In one embodiment, the location engine is further configured for transmitting, to a second computing device, an arrival notification, responsive to determining that the current location of the portable computing device is within the identified region. In a further embodiment, the location engine is further configured for transmitting a user identification to the second computing device with the arrival notification. In another further embodiment, the location engine is further configured for disabling determining a current location of the portable computing device, responsive to determining that the current location of the portable computing device is within the identified region. In still another further embodiment, the location engine is further configured for repeating the steps of determining the current location of the portable computing device and comparing the current location of the portable computing device to the identified region at a second predetermined frequency responsive to determining that the current location of the portable computing device is inside of the identified region. In a still further embodiment, the location engine is further configured for transmitting, to the second computing device, a departure notification, responsive to determining that the current location of the portable computing device is not within the identified region.

In some embodiments, the location engine is further configured for disabling determining a current location of the portable computing device, responsive to identifying that a current time is more than a predetermined period of time after the planned arrival time. In other embodiments, the location engine is further configured for disabling determining a current location of the portable computing device prior to the predetermined period of time before the planned arrival time. In yet other embodiments, the location engine is further configured for determining a current location of the portable computing device by transmitting a location query to a location service executed by the second computing device or a third computing device. In still yet other embodiments, the location engine is further configured for comparing the current location of the portable computing device to the identified region by transmitting an identification of the current location of the portable computing device to the second computing device or a third computing device, and receiving from said second computing device or third computing device an identification of whether or not the portable computing device is within the identified region.

In another aspect, the present disclosure is directed to a method for tracking locations of a plurality of devices within overlapping geofences. The method includes receiving, by a location analyzer executed by a computing device, an identification of (i) a first region defined by a first geofence; (ii) a second region defined by a second geofence distinct from the first geofence; and (iii) a third region defined by a third geofence including the first region and second region. The method also includes receiving, by the location analyzer, a plurality of arrival notifications from a corresponding plurality of devices, each arrival notification sent by each device responsive to said device determining it has entered the third geofence. The method further includes receiving, by the location analyzer, user information for a user of each of the plurality of devices. The method also includes identifying, by the location analyzer, a first subset of the plurality of devices that are within the first region and a second subset of the plurality of devices that are within the second region. The method further includes comparing, by the location analyzer, user information of the users of the first subset of the plurality of devices and user information of the users of the second subset of the plurality of devices. The method also includes transmitting, by the location analyzer to a second computing device, a comparison metric identifying a difference between users of the first subset of the plurality of devices and users of the second subset of the plurality of devices.

In one embodiment of the method, the first region and the second region do not overlap. In another embodiment of the method, each arrival notification is sent by each device further responsive to a current time being within a predetermined time period of a planned arrival time.

In some embodiments, each arrival notification comprises a geographic location of the corresponding device. In other embodiments, the method includes receiving, by the location analyzer, one or more current device locations from a corresponding one or more of the plurality of devices, sent by each device responsive to said device determining it is still within the third geofence. In a further embodiment, the method includes re-identifying a first subset of the plurality of devices that are within the first region and a second subset of the plurality of devices that are within the second region based on the received one or more current device locations. The method also includes re-comparing, by the location analyzer, user information of the users of the first subset of the plurality of devices and user information of the users of the second subset of the plurality of devices. The method further includes transmitting, by the location analyzer to the second computing device, an updated comparison metric identifying a change in the difference between users of the first subset of the plurality of devices and users of the second subset of the plurality of devices.

In still another aspect, the present disclosure is directed to a system for tracking locations of a plurality of devices within overlapping geofences. The system includes a computing device comprising a processor executing a location analyzer. The location analyzer is configured for receiving an identification of (i) a first region defined by a first geofence; (ii) a second region defined by a second geofence distinct from the first geofence; and (iii) a third region defined by a third geofence including the first region and second region. The location analyzer is also configured for receiving a plurality of arrival notifications from a corresponding plurality of devices, each arrival notification sent by each device responsive to said device determining it has entered the third geofence. The location analyzer is further configured for receiving user information for a user of each of the plurality of devices, and for identifying a first subset of the plurality of devices that are within the first region and a second subset of the plurality of devices that are within the second region. The location analyzer is also configured for comparing user information of the users of the first subset of the plurality of devices and user information of the users of the second subset of the plurality of devices. The location analyzer is further configured for transmitting, to a second computing device, a comparison metric identifying a difference between users of the first subset of the plurality of devices and users of the second subset of the plurality of devices.

In one embodiment of the system, the first region and the second region do not overlap. In another embodiment of the system, each arrival notification is sent by each device further responsive to a current time being within a predetermined time period of a planned arrival time. In still another embodiment of the system, each arrival notification comprises a geographic location of the corresponding device.

In some embodiments, the location analyzer is further configured for receiving one or more current device locations from a corresponding one or more of the plurality of devices, sent by each device responsive to said device determining it is still within the third geofence. In a further embodiment, the location analyzer is further configured for re-identifying a first subset of the plurality of devices that are within the first region and a second subset of the plurality of devices that are within the second region based on the received one or more current device locations. The location analyzer is also configured for re-comparing user information of the users of the first subset of the plurality of devices and user information of the users of the second subset of the plurality of devices. The location analyzer is further configured for transmitting, to the second computing device, an updated comparison metric identifying a change in the difference between users of the first subset of the plurality of devices and users of the second subset of the plurality of devices.

In yet another aspect, the present disclosure is directed to a method for tracking locations of a plurality of devices within overlapping geofences. The method includes receiving, by a portable computing device, an identification of a first geofence defining a first region. The method also includes determining a current location of the portable computing device. The method further includes comparing the current location of the portable computing device to the identified first geofence. The method also includes transmitting, by the portable computing device to a second computing device, an arrival notification, responsive to determining that the current location of the portable computing device is within the identified first region, the arrival notification including an identification of the current location of the portable computing device within one of a plurality of subregions of the first region defined by a corresponding plurality of geofences.

In one embodiment, the method includes receiving, by the portable computing device from the second computing device, an identification of one or more users of other portable computing devices within the same one of the plurality of subregions of the first region as the portable computing device. In a further embodiment, the identification of the one or more users of other portable computing devices comprises an identification of a gender ratio of the one or more users within the same one of the plurality of subregions.

In some embodiments, the method includes transmitting a current location of the portable computing device to the second computing device, at a predetermined frequency, until the portable computing device determines that the current location of the portable computing device is no longer within the identified first region. In another embodiment, the method includes transmitting a current location of the portable computing device to the second computing device, at a predetermined frequency, until expiration of a predetermined time period. In yet another embodiment, the method includes receiving, by the portable computing device, an identification of a planned arrival time. The method also includes identifying, by the portable computing device, that a current time is within a predetermined period of time before the planned arrival time. In such embodiments, determining a current location of the portable computing device is performed responsive to the identification that the current time is within the predetermined time period before the planned arrival time. In a further embodiment, the method includes, prior to transmitting the arrival notification, repeating determining the current location of the portable computing device and comparing the current location of the portable computing device to the identified first geofence at a predetermined frequency, responsive to determining that the current location of the portable computing device is outside of the identified first region. In many embodiments, the arrival notification includes an identification of a user of the portable computing device.

BRIEF DESCRIPTION OF THE FIGURES

FIG. 4B is a exemplary table of an embodiment of demographics comparison for comparative geofences;

In the drawings, like reference numbers generally indicate identical, functionally similar, and/or structurally similar elements.

DETAILED DESCRIPTION

Figure 1A:
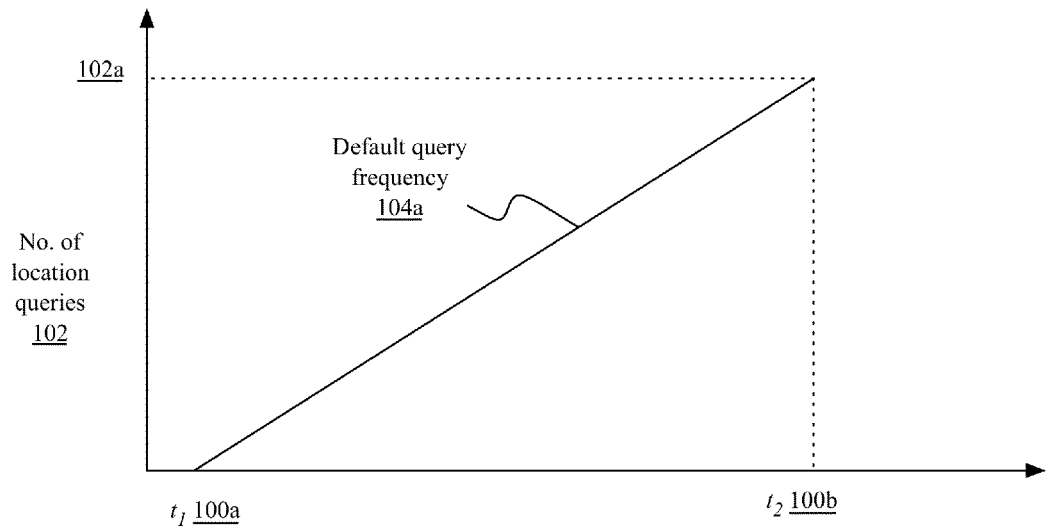
FIG. 1A is a chart illustrating a number of location queries over time at a default query frequency in one embodiment of a geolocation system.

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

For purposes of reading the description of the various embodiments below, the following descriptions of the sections of the specification and their respective contents may be helpful:

Section A describes embodiments of methods and systems for time-based geolocation;

Section B describes embodiments of methods and systems for comparative geofencing;

Section C describes embodiments of computing devices which may be useful for practicing embodiments described herein; and Section D describes an exemplary user interface for setting up time-based geolocation events and reviewing comparative geofence demographics.

A. Embodiments of Methods and Systems for Time-Based Geolocation

Although useful, geolocation systems tend to consume a great deal of resources of portable computing devices. For example, the devices may expend battery power increasing signal gain for GPS antennas or WiFi antennas, may utilize many CPU cycles during processing of location information, transmit frequent requests to a location service provider, etc. This problem is compounded with modern uses of geofencing. Geofences define geographic locations, and may comprise circles, squares, paths, or any other 2-dimensional, or in some embodiments, 3-dimensional shape. Geofences are typically used for triggering an event, such as the location-based reminders provided by the iOS operating system component Siri, manufactured by Apple Inc. of Cupertino, Calif. For example, in one such embodiment, a user may set a location based reminder to remind them to "feed the cats" when they arrive "home", which may be defined as a short radius (e.g. 10 m) circular geofence centered on a geographic coordinate previously designated as "home". The user's device may periodically transmit location queries to a service provider, receive coordinates, and determine whether the device is within the circle. Upon determining that the device is within the geofenced region, the device may trigger the event or reminder, such as playing a sound or displaying a message.

In these typical systems, the user's device may transmit location queries and perform coordinate comparisons at frequent intervals, regardless of how far the user is from arriving home and regardless of whether the user has even departed a previous location. Rather, the device begins performing location comparisons as soon as the user sets the trigger. As these notification and location services may run in the background, the device may perform queries without the user realizing it for days, weeks, or even months if the geofence is not entered, reducing battery life, and needlessly consuming bandwidth and CPU cycles. Even if the user does arrive at home and triggers the event, if there are further location based reminders set for other locations, the device will continue performing queries.

For example, referring now to FIG. 1A, illustrated is a chart showing a number of location queries 102 over time 100 at a default query frequency 104a in one embodiment of a geolocation system. As shown, at some time $t_1$ 100a, a user may set a location based event, notification, or reminder. In response to setting the event, the device will determine parameter, transmit queries, and perform geographic location comparisons at the default query frequency, such as once every 15 minutes. At some subsequent time $t_2$ 100b, the user may arrive at the location. On a subsequent query and comparison, the device may identify that it is within the geofenced area, and may trigger the event or notification. At this point, the device will have made a number of location queries 102a equal to $t_2-t_1$ divided by the query frequency. For example, if it was 12 hours between when the user set the event and when the user arrived at the designated region, and the frequency was one query every 15 minutes, the device would have transmitted 48 queries. If the user had not planned on leaving their previous location for the first 11 hours, 44 of those queries would have been unnecessary.

Accordingly, the systems and methods described herein allow for time-based geolocation queries, with designated planned arrival and/or departure times or event start/end times. The number of queries can be drastically reduced, or the rate of queries can be increased within a specified time frame, providing much higher resolution of geolocation information.

Figure 1B:
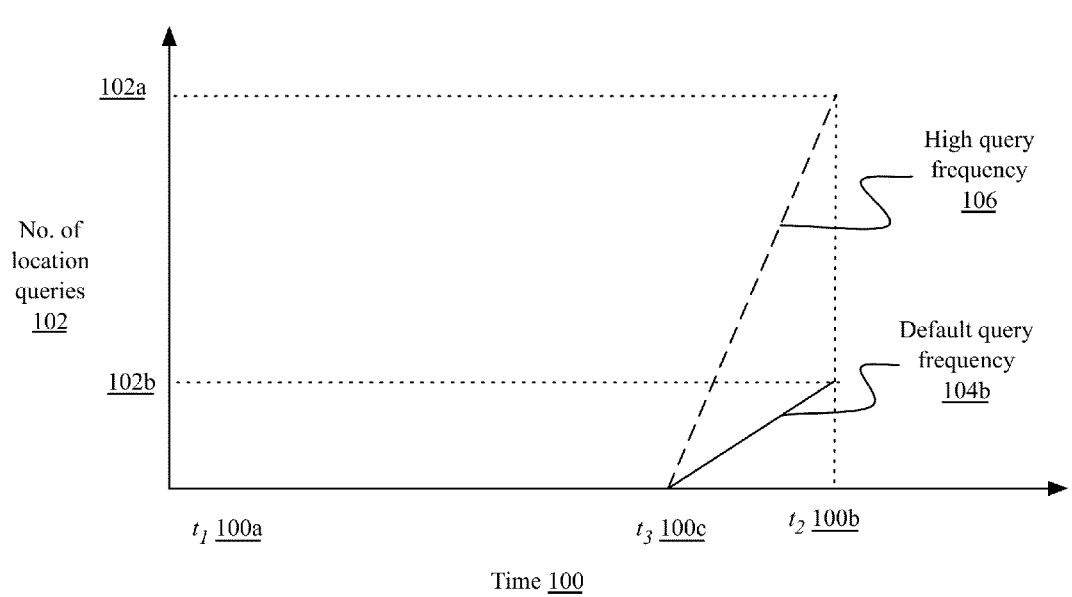
FIG. 1B is a chart illustrating a number of location queries over time in embodiments of a geolocation system with a planned arrival time, including a default query frequency and a high query frequency.

For example, referring now to FIG. 1B, illustrated is another chart showing a number of location queries 102 over time 100 in embodiments of a geolocation system with a planned arrival time. As with the example above, the user may set a location based event, notification, or reminder at a first time $t_1$ 100a, but may specify a planned arrival time. In some embodiments, the planned arrival time may be an actual estimated time of arrival, such as $t_2$ 100b. The system may select a prior time $t_3$ 100c to begin initiating queries, according to a policy. For example, a policy may indicate that the device should begin initiating location queries one hour prior to a planned arrival time $t_2$ 100b, half an hour, or any other such predetermined period of time. In other embodiments, the user may set the planned arrival time $t_3$ 100c directly as a period of time before the event start or likely actual arrival time.

At $t_3$ 100c, the device may begin identifying parameters and transmitting location queries. In some embodiments, the device may initiate queries at the a default query frequency 104b as discussed above, such as a 15 minute interval. If the planned arrival time $t_3$ was one hour prior to the user arriving at the geofence, then this would result in only 4 queries 102b, utilizing less than 10% of the resources required in the example of FIG. 1A. In other embodiments, the device may initiate queries at a higher query frequency 106, such as once every 75 seconds. As shown, in such an embodiment, the device may transmit the same number of queries 102a as in the example of FIG. 1A, but only during the time during which the user is likely to be arriving at the geofence.

Increasing the query frequency may reduce arrival time errors: if the user arrives at the geofence shortly after a query has been transmitted, the device may need to wait for almost the entire query interval before transmitting another query and identifying that the user has reached the geofence, or up to 15 minutes in the example of FIG. 1A, but only up to 75 seconds in the high query frequency example of FIG. 1B.

Furthermore, in some embodiments, the device may continue transmitting geolocation queries while the user is within the geofence, until the user leaves or a predetermined departure time or event end time arrives. For example, rather than just being used for reminders that are only activated upon arrival at a location, the geolocation services may be used for identifying a location within a geofence during an event, transmitting notifications that a user is at an event, coordinating meetings between multiple users within a geofenced region, and/or triggering events upon departure from a geofenced region.

Figure 1C:
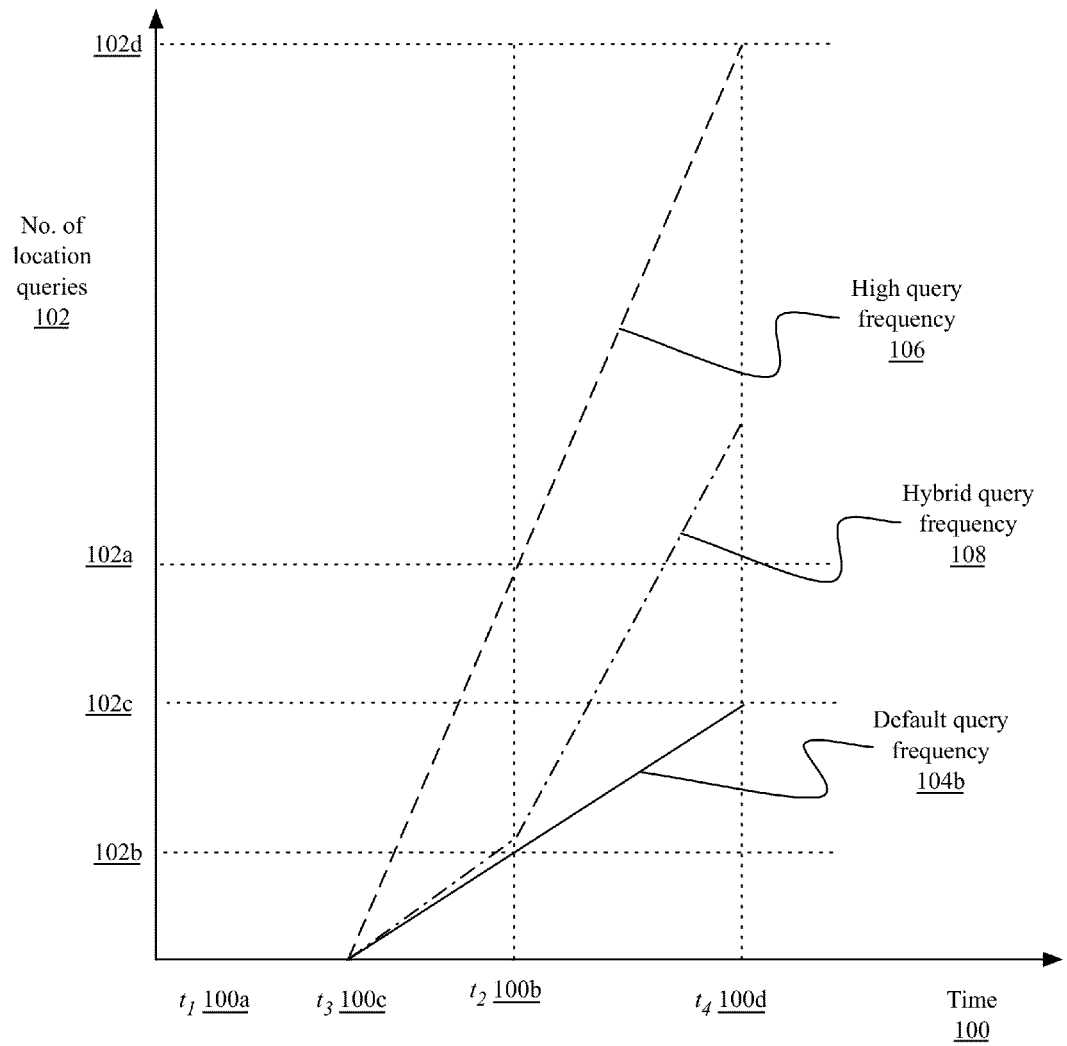
FIG. 1C is another chart illustrating a number of location queries over time in embodiments of a geolocation system with a planned arrival time and departure time, including a default query frequency and a high query frequency.

For example, FIG. 1C is another chart illustrating a number of location queries over time in embodiments of a geolocation system with a planned arrival time and departure time or start time and end time. As shown and as discussed above in connection with FIG. 1C, in some embodiments, a device may begin initiating queries at a predetermined time period $t_3$ 100c before a planned arrival time $t_2$ 100b or actual arrival time. Once the user arrives at the geofenced region at time $t_2$ 100b, the device may continue initiating geolocation queries until a planned departure time $t_4$ 100d. For example, if the event is a party lasting two hours, the device may continue transmitting queries at the default query frequency 104b as discussed above resulting in 8 additional queries or a total of 12 queries 102c. In other embodiments, the device may continue transmitting queries at the high query frequency 106, resulting in 144 queries total. In other embodiments using a hybrid query frequency 108, the device may transmit queries at a first query frequency, such as once every 15 minutes, until the user arrives at the geofenced region, and then may transmit queries at a second higher query frequency, such as once every minute.

Although these latter embodiments consume more resources, increasing the query frequency during the event may allow for finer resolution of location within a space. For example, in implementations of location tracking in large nightclubs, a user's location may be tracked as they walk around, allowing monitoring by venue operators of the number of users on a dance floor, at a particular bar or lounge, or waiting for a coat check.

In another similar hybrid query frequency embodiment not illustrated, the device may transmit queries at a high rate until the user arrives at a geofenced region, and then transmit queries at a reduced rate until the user leaves the region or the planned departure or end time occurs. This may be useful in implementations in which an event needs to be coordinated precisely with a user's arrival, such as beginning cooking of a dish at a restaurant, but where less accurate tracking is required for a departure time.

In a further hybrid query frequency embodiment, a location service provider may transmit a query frequency to a device, such as with a response to a query. For example, the query frequency for the device to use may be placed in a header or options field of a data packet. This may allow the location service provider to dynamically adjust query frequencies based on latency or processing requirements, or responsive to some external event. For example, in the event of a fire or other emergency, an operator of a venue with an associated geofence may direct a location service provider to command all devices within the geofenced region to initiate queries at a high query frequency, allowing the operator to quickly identify whether any users are still in the venue.

Figure 1D:
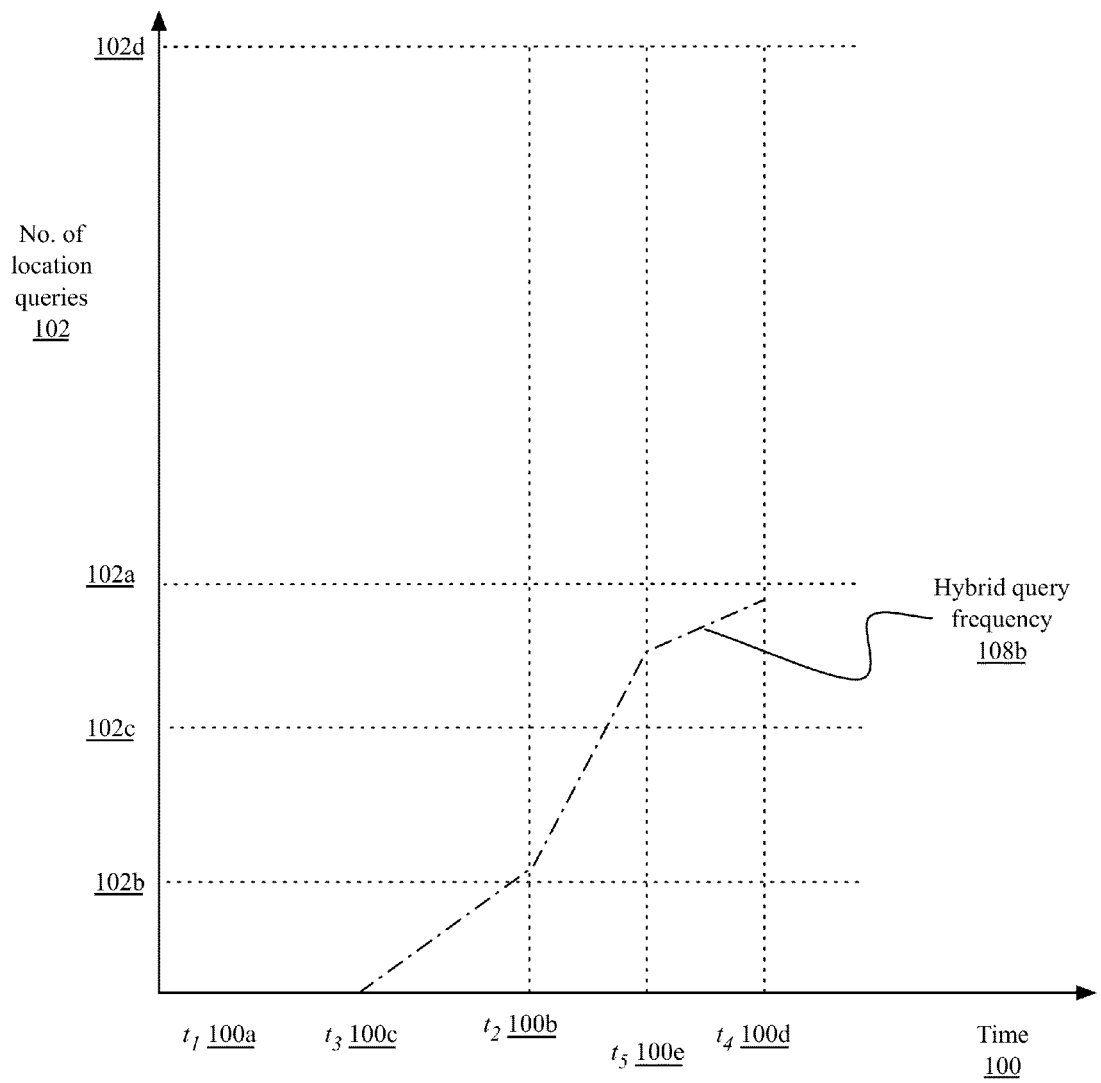
FIG. 1D is still another chart illustrating a number of location queries over time in embodiments of a geolocation system with a planned arrival time and departure time, including a default query frequency and a high query frequency.

In still other embodiments, rather than ending queries upon departure from a geofenced region or venue, a device may transmit queries at a third frequency responsive to the user departing the region prior to a planned departure time or event end time $t_4$ 100d. For example, as shown in the chart of FIG. 1D, a device may begin initiating queries at a predetermined time period $t_3$ 100c before a planned arrival time $t_2$ 100b or actual arrival time. Once the user arrives at the geofenced region at time $t_2$ 100b, the device may transmit queries at an increased frequency. Upon detecting that the user has left the geofenced region at time $t_5$ 100e, the device may continue initiating geolocation queries at a third, lower frequency until a planned departure time $t_4$ 100d. This may be useful in implementations where the user may return to the geofenced region prior to the planned end time of the event.

In many embodiments, the device may transmit a notification to a second device, such as a server operated by a venue operator. The notification may include any type and form of relevant information, including a device identifier, user identifier, user profile, user demographic information such as gender or age, and/or geographic coordinates. In some embodiments, the second device may include or communicate with a database of users, such that the device only needs to send a user identifier (and possibly coordinates) and the second device may retrieve a stored user profile to identify demographic information about the user. The notification may be transmitted via any means, including text or SMS message, email, or data packet, such as an HTTP POST request, JSON query, or other means. The notifications may be sent on arrival at a geofenced area, upon departure from the area, and/or periodically while the device is within the geofenced area.

Figure 2:
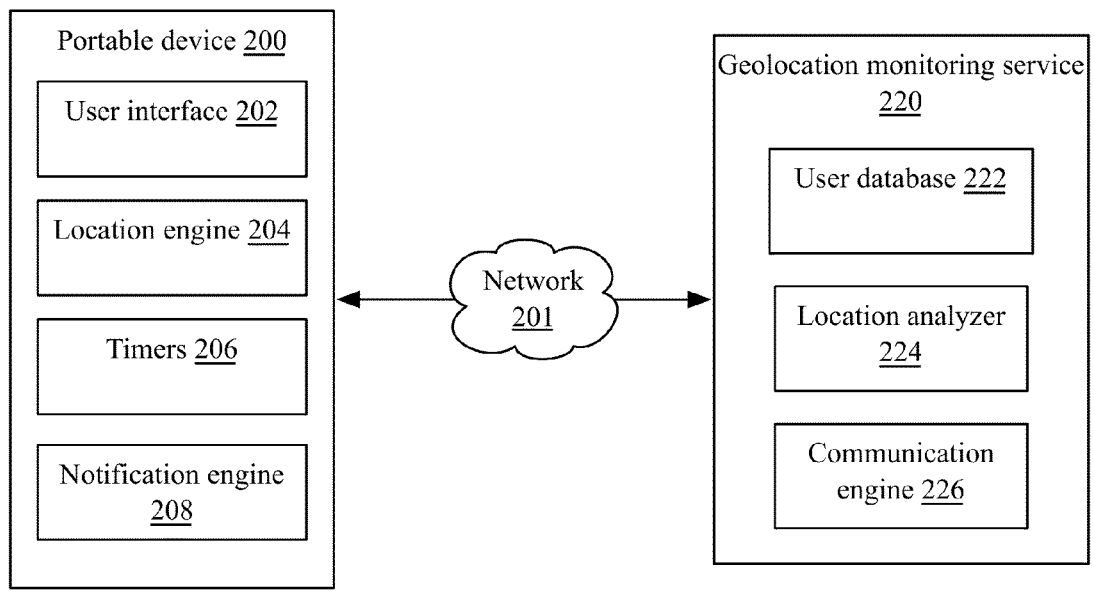
FIG. 2 is a block diagram of an embodiment of a system for geolocation and user demographics monitoring.

Referring now to FIG. 2, illustrated is a block diagram of an embodiment of a system for geolocation and user demographics monitoring. As shown, a portable device 200, such as a tablet, smart phone, or other computing device, may communicate via a network 201 with a geolocation monitoring service 200, which may be executed by another device, such as a server, workstation, desktop computing device, server farm, or a virtual machine or cloud service executed by a computing device or farm of computing devices. The network 201 may comprise any type and form of network, including a wide area network such as the Internet, and may comprise one or more types of physical networks, including cellular networks, WiFi networks, and wired networks. For example, in many common implementations, the portable device 200 may communicate with a cellular network such as a 3 G or 4 G network, which may connect via one or more gateways to a wide area network such as the Internet. In other embodiments, the portable device 200 may communicate with the geolocation monitoring service 220 via a local area network, wireless local area network, near-field communication ad-hoc network or similar network, or any other type and form of communication interface.

In some embodiments, the portable device 200 may include a user interface 202. User interface 202 may comprise any type and form of user interface, including a graphical user interface and/or command line interface, for setting a time-based geolocation notification event. In some embodiments, a user may set a time-based geolocation notification by indicating that they will be at an event or venue at a specified time. For example, the user may indicate that they will be attending a nightclub at a particular date and time, or will be attending a concert at a particular venue on a specified day and time. The device may set a time-based geolocation event accordingly. In one such embodiments, the user may make such indications in connection with purchasing tickets to or registering for an event, pre-paying an entry fee, purchasing a VIP service or bottle service, watching an advertisement, or any other such processes. In many embodiments, the user interface 202 may be provided by a web browser, while in other embodiments, the user interface 202 may be provided by a dedicated application, such as a smartphone application. Such applications may incorporate other desirable features, including posting messages to a social network service, or geotagging photos or videos or tagging media as being associated with an event the user is attending.

The device 200 may include a location engine 204. Location engine 204 may comprise an application, service, server, daemon, routine, library, or any type and form of executable logic for location determination and comparison. In many embodiments, location engine 204 may be provided by an operating system of device 200, and may communicate with user interface 202, timers 206, and/or notification engine 208 via an application programming interface (API) or other method. Location engine 204 may comprise functionality for receiving, amplifying, or otherwise processing signals such as those from GPS satellites, cellular transmitters, and/or WiFi transmitters. In some embodiments, location engine 204 may directly provide geographic coordinates to the user interface 202 and/or notification engine 208, such as from a GPS reception and processing algorithm, while in other embodiments, location engine 204 may transmit a query to a location service provider including identifiers and strengths of visible cellular towers, WiFi service set identifier (SSID) names, IP addresses, or device identifiers. Location engine 204 may, alone or in combination with a location service provider, perform GSM location or triangulation, time difference of arrival (TDOA) processing, near location based service (NLBS) tracking, or any other location determination system.

In many embodiments, location engine 204 may also perform comparisons of location coordinates of the device, either internally determined or received from a location service provider, with geofence coordinates. As discussed above, geofences may be of any shape or size and may be defined by geographic boundaries or paths. Location engine 204 may perform mathematical comparisons of coordinates of the device to the geofence identifying coordinates to determine whether the device is within the geofence or not. For example, in one embodiment, a geofence may be defined by a center coordinate and a radius, and the location engine may determine whether a distance between the center coordinate and coordinates of the device exceed the length of the radius. Other algorithms may be used, such as comparing device coordinates to a bitmap or array of geofence coordinates or to geofence coordinates determined based on a union of several Boolean conditions, for complex geofence shapes.

Portable device 200 may execute or maintain one or more timers 206, which may also include a local or absolute time clock. Clocks or timers 206 may be provided by an operating system of the device, or may be maintained separately by notification engine 208 and/or location engine 204. Timers 206 may be periodic, such as query interval timers, or may be clock alarms or set times, such as planned arrival and departure times or start and end times for an event. As discussed above, periodic timers 206 may be variable in length or set according to a policy or received command.

Portable device 200 may comprise a notification engine 208, which may be an application, service, server, daemon, routine, or other executable logic for transmitting one or more notifications to a geolocation monitoring service 220 or other computing device. Notification engine 208 may comprise a portion of a network stack, or may communicate with a network stack or other communications interfaces. For example, notification engine 208 may generate data packets for transmission by a cellular transmitter of the device 200. Notifications may be of any type and form, including text messages, SMS messages, MMS messages, or any type and form of data packets. For example, in some embodiments, notifications may comprise representational state transfer (REST) requests, such as HTTP POST or parameterized GET requests, XML data, or any other type and form of transmission. In many embodiments, notifications may be asynchronous, or not require confirmation. For example, notifications may be sent via a user datagram protocol (UDP) or other unreliable protocol, or may be transmitted via a reliable protocol such as transmission control protocol (TCP) with responses ignored or not expected.

As discussed above, notifications may be sent by the device responsive to arrival at a geofenced region, responsive to departure from the region, and/or periodically while within the geofenced region. Notifications may include user identification, device identification, user profile information, user demographic information such as age or gender, a user image or picture, coordinates of the device, or any other type and form of information. In one embodiment, to reduce bandwidth requirements, the device may transmit a first set of data with an initial notification, and a subset of the data with later notifications. For example, the device may transmit some or all of the above-identified information with a first notification, and only a user identification and/or coordinates in a subsequent notification. In a related embodiment, the device may receive a notification identifier from the geolocation monitoring service responsive to the first notification, such as a small temporary identifier, and may simply retransmit the identifier and coordinates in further notifications until the user leaves the geofenced region or the event end time occurs. In another embodiment, the device may transmit a portion of available information with each notification, providing the full set of information over the course of several notifications.

In still other embodiments, the user may pre-register with the geolocation monitoring service, such that by sending a user identifier, the monitoring service may retrieve a user profile or demographic information. For example, as discussed above in connection with user interface 202, the user may log into an application or web site to indicate that they will attend an event, purchase tickets to the event, or otherwise generate the time-based geolocation event. The web site may be provided by a web server of geolocation monitoring service 220 or in communication with geolocation monitoring service 220, or the application executed on the device 200 may communicate with the geolocation monitoring service 220 when the user registers for the event or purchases tickets. When the user first registers with the web site or application, the user may fill out a profile or link to a social networking profile, such as a Facebook account provided by Facebook, Inc. of Menlo Park, Calif., or a Google Plus account provided by Google, Inc. of Mountain View, Calif. The profile may be associated with a user identifier, such that the monitoring service may retrieve the profile and identify demographic information about the user responsive to receiving the notification including the user identifier.

Geolocation monitoring service 220 may include or maintain a user database 222, or communicate with a social network provider to retrieve user profiles, as discussed above. User database 222 may comprise a database, flat file, data file, SQL database, or any other type and form of data storing information about users, including names, identifiers, device identifiers, demographic information such as age or gender, past event attendance information, purchase history, credit card or other purchase information, associations or connections with other users, photos or other multimedia, or any other type and form of information. In some embodiments, user database 222 may be populated by users filling out profiles during registration with the service, while in other embodiments, user database 222 may be populated by retrieval of data from a social networking service.

Geolocation monitoring service 220 may comprise a location analyzer 224. Location analyzer 224 may comprise an application, service, server, daemon, routine, or other executable logic for receiving notifications from a plurality of devices 200 of users, identifying devices as being within one or more geofenced regions or overlapping regions, and determining aggregated demographic information for a location. For example, location analyzer 224 may receive arrival notifications from a plurality of devices in a geofenced region, such as a nightclub; may retrieve gender demographic information from corresponding user profiles; and may identify a gender ratio of users in the geofenced region. Said gender ratio may be displayed on a website or other service, transmitted to devices 200 for display in a web browser or other application, or otherwise shown to potential visitors of the nightclub. This may allow dynamic, real-time display and comparison of demographic information between a plurality of venues, allowing potential visitors to select venues based on desired gender ratios. Similarly, average ages or age ranges may be displayed, as well as any other demographic criteria.

Demographic criteria may also be provided to the operator of each venue, allowing them to dynamically adjust offers based on attendance, such as reducing entry admission for an underrepresented gender, or dynamically changing music selections to accommodate the majority of patrons' preferences (e.g. if a majority of users at a venue have "liked" a particular band in their social network profiles).

Geolocation monitoring service 220 may comprise a communication engine 226 for communicating with portable devices 200, computing devices at venues or provided by venue operators, or a computing device providing a web site or web service for applications as discussed above. Communication engine 226 may comprise an application, service, server, daemon, routine, or other executable logic for receiving and parsing notifications, and transmitting geolocation monitoring or demographics information, and may comprise or communicate with a network stack or interface of the service 220.

Figure 3:
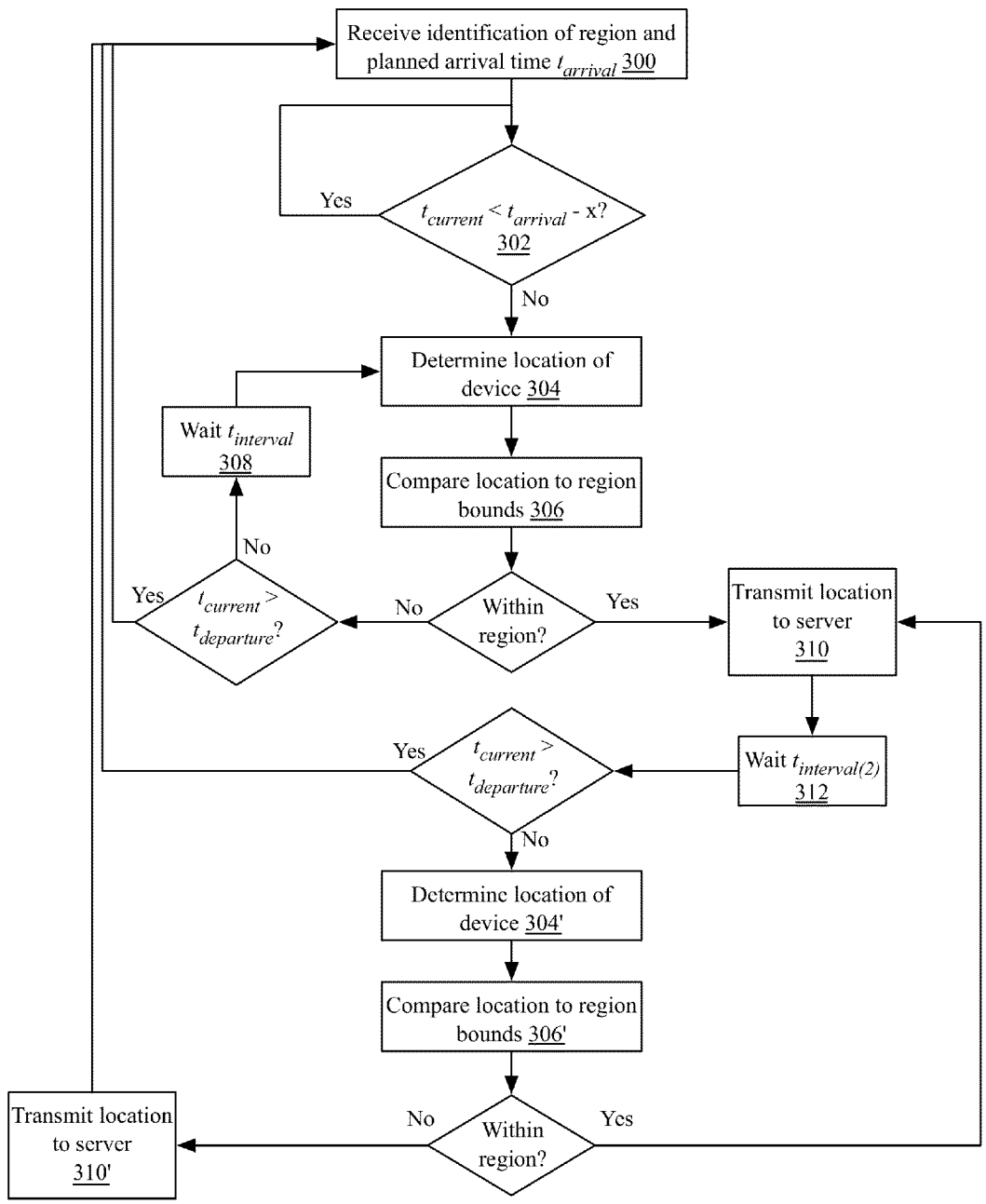
FIG. 3 is a flow chart of an embodiment of a method for time-based geolocation.

Referring now to FIG. 3, illustrated is a flow chart of an embodiment of a method for time-based geolocation. In brief overview, at step 300, a device may receive an identification of a geofenced region and a planned arrival time $t_{arrival}$. At step 302, the device may determine if the current time $t_{current}$ is prior to a predetermined time period x before the planned arrival time $t_{arrival}$. If so, then the device may repeat step 302 at periodic intervals. If the current time is within the predetermined time period before the planned arrival time, then at step 304, the device may determine the location of the device. At step 306, the device may compare the location to the geofenced region boundaries. If the device is not within the region, and the current time is not later than a planned departure time $t_{departure}$, then the device may wait for a time $t_{interval}$ at step 308, and then may repeat steps 304-306. If the current time is later than the planned departure time, the method may end and/or proceed with regard to a next region and arrival time at step 300.

If the device is within the region, then at step 310, the device may transmit a notification and/or location to a server or geolocation monitoring service. At step 312, the device may wait for an interval $t_{interval(2)}$. If the current time is after the departure time, the method may end and/or proceed with regard to a next region and arrival time at step 300. Otherwise, the device may repeat a location determination process of step 304' and step 306'. If the device is still within the region, then the device may repeat steps 310-312. Otherwise, if the device has left the region, the device may transmit a departure notification to the server or geolocation monitoring service at step 310', and the method may end and/or proceed with regard to a next region and arrival time at step 300.

Still referring to FIG. 3 and in more detail, at step 300, a device may receive an identification of a geofenced region and a planned arrival time $t_{arrival}$. As discussed above, the geofenced region may be of any shape or size. The planned arrival time may comprise an event start time, a reservation time, or any other time. As discussed above, in some embodiments, the device may receive the identification from a user via a user interface, responsive to the user registering for an event, purchasing a ticket to an event, indicating attendance at an event or venue, or any other such operation.

In some embodiments, at step 302, prior to the planned arrival time $t_{arrival}$ or prior to a predetermined time period x prior to the planned arrival time, the device may not determine a location. This may reduce battery and CPU utilization. Once the current time is equal to or later than the predetermined time period x prior the planned arrival time $t_{arrival}$, the device may begin determining the location and the method may proceed.

At step 304, the device may determine a current location of the device. In some embodiments, as discussed above, the device may process GPS signals to identify geographic coordinates of the device. In other embodiments, the device may process cellular signals, WiFi signals, or other signals. In many embodiments, the device may transmit a query to a location service provider with parameters of detected signal types, frequencies, and/or strengths, and may receive coordinates of the device. In other embodiments, the device may consult an internal database of signal origins and may triangulate the coordinates of the device accordingly. In many embodiments, the device may determine a current location of the device using an API provided by an operating system of the device.

At step 306, the device may compare the coordinates or current location of the device to the boundaries of the geofenced region. As discussed above, in some embodiments, the geofenced region may be identified via a bitmap or array, and the device may identify a point within the bitmap or array as corresponding to its coordinates and determine whether it lines within the geofenced region. In other embodiments, the device may determine mathematically whether its current location lies within the geofenced region, such as comparing the distance between the coordinates of the device and the center of a geofence circle to a radius of the circle. If the device determines that it is not within the region, and more time exists before a planned departure time or an end of the event $t_{departure}$, then the device may wait a predetermined query interval $t_{interval}$ at step 308. As discussed above, this may be a default query interval, or may be a higher frequency query interval to provide finer temporal resolution. Upon expiration of the query interval, the device may repeat steps 304 and 306. If the current time is after the planned departure time or event end time, then in some embodiments, the device may stop determining the location of the device and may return to a start or waiting state. In other embodiments, such as if the user has registered for a later event, the device may return to step 300 with the new event location as the region and new event start time as $t_{arrival}$.

If the device determines that it has entered the region, then at step 310, the device may transmit a notification to a server or geolocation monitoring service. As discussed above, the notification may comprise an HTTP POST request, an SMS communication, or any other type and form of communication. The notification may include a device identifier, user identifier, coordinates of the device, and/or any other information, as discussed above.

At step 312, the device may wait for an interval $t_{interval(2)}$. This may be the same as $t_{interval}$, as discussed above in connection with default and high frequency queries 104b and 106 of FIG. 1C or may be a different interval, as discussed above in connection with hybrid query frequency 108. The interval may be shorter, to provider greater temporal resolution, or may be longer, to conserve battery and CPU utilization. In some embodiments, in response to the transmission of location at step 310, the geolocation monitoring service may transmit a new $t_{interval(2)}$ for the device to use, as discussed above.

If after waiting at step 312, the current time is after the event end or planned departure time, then the method may end and/or proceed with regard to a next region and arrival time at step 300. If the current time is prior to the event end or planned departure time, then the device may repeat steps 304 and 306 (shown as steps 304' and 306') as discussed above. If the device is still within the region, then device may repeat steps 310-312. If, however, the device is no longer within the region, then the device may transmit a departure notification to the server at step 310'. The departure notification may be similar or identical to an arrival or location notification, with coordinates indicating the device is outside of the region, or may be different. For example, notifications may include flags to indicate arrival, departure, or that the device is still within the region and is sending an update or refresh to the service (to indicate that the device is not lost or has powered off). Furthermore, although not illustrated, as discussed above, in some embodiments, the method may proceed from step 310' to repeated iterations of steps 304-308, in case the user re-enters the geofenced region.

Accordingly, through the above-discussed systems and methods, devices may utilize geolocation with time-based parameters to reduce battery and CPU usage, and/or provide enhanced temporal resolution within a time window of interest, and may notify a geolocation monitoring service which may be configured to monitor devices within a region for entry and departure.

B. Embodiments of Methods and Systems for Comparative Geofencing

Conventional geofencing allows reference to only one space at a time. This may make it difficult to compare one geofenced area to similar geofenced areas nearby. Even in some instances with overlapping geofences, devices are typically associated with only one geofence at a time, with a most-recently entered region having priority. As the device typically maintains awareness of only its own location, it lacks knowledge of other devices and cannot make meaningful determinations or comparisons about regions.

Accordingly, in some embodiments, a geolocation monitoring service, such as embodiments of the service discussed above, may receive notifications from a plurality of devices and may maintain demographic information of the devices in each region. In some embodiments, each device may know of an overall monitored area or broad region geofence, and the geolocation monitoring service may identify subregions within the broad region and associated devices with such subregions. This may allow each device to simply operate as if only the larger geofenced region existed and provide updates of coordinates to the monitoring service, without needing advanced capabilities or additional geofence knowledge.

Figure 4A:
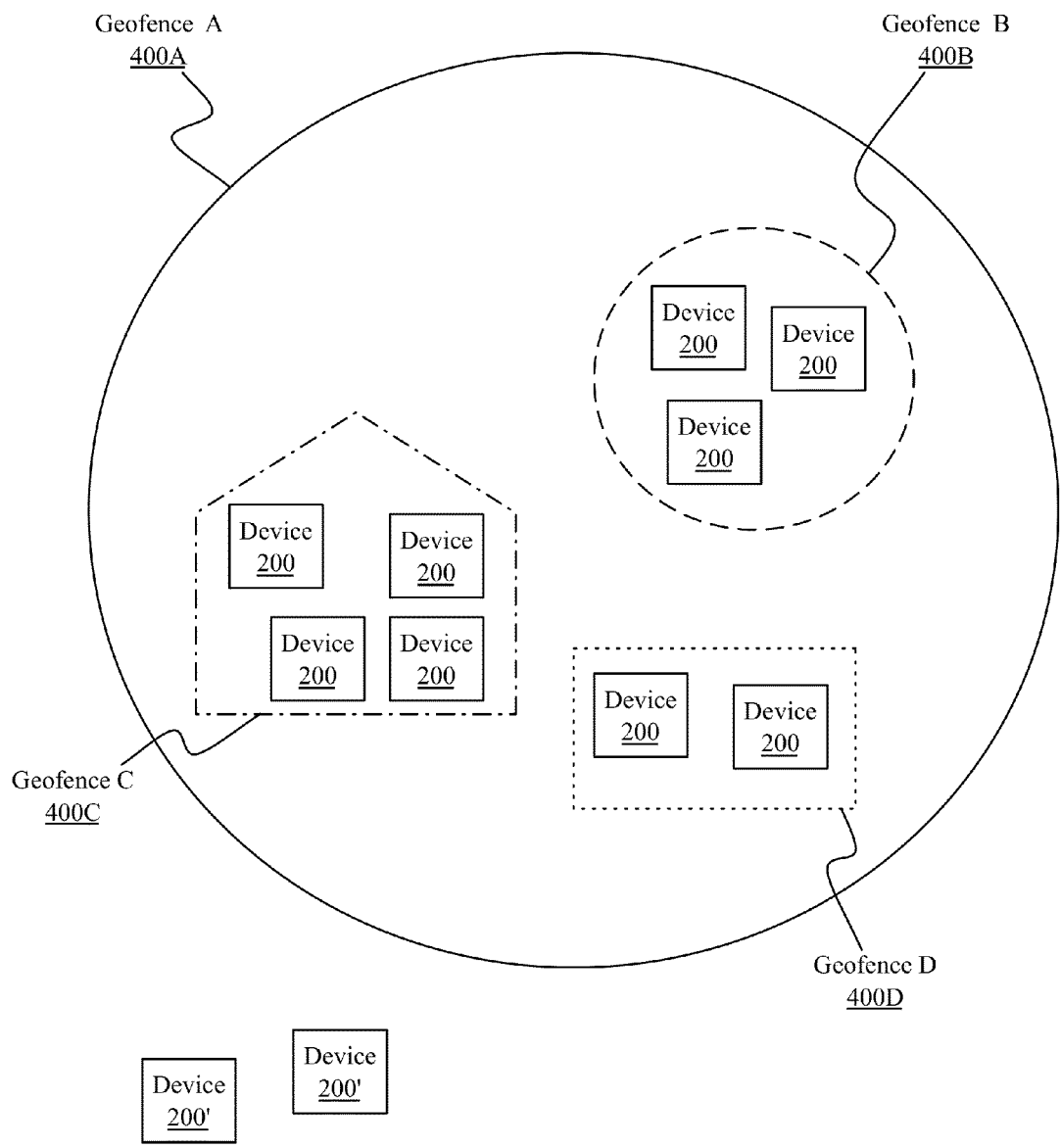
FIG. 4A is a diagram of an embodiment of comparative geofences.

For example, referring to FIG. 4A, illustrated is a diagram of an embodiment of comparative geofences. As shown, an overall region may be defined by a first geofence A 400A. One or more subregions 400B-400D may be defined within the overall region. The region and subregions may be of any shape and size, as shown. For example, a subregion may comprise a restaurant, nightclub, or individual building, while a region may comprise a neighborhood, street, campus, city, or any other size area. In some embodiments, a subregion may be a single room within a building or smaller, depending on location information resolution.

The monitoring service may receive notifications from devices 200 on entry or departure from the overall geofence 400A, as well as periodic updates of coordinates within the overall geofence from devices remaining in the area, using the methods and systems discussed above. The monitoring service may identify from location information sent with a notification that a device 200 is within a particular subregion 400B-400D, and may update statistics about each subregion accordingly.

As discussed above, devices 200' external to the overall region 400A may not transmit notifications to the monitoring service in many embodiments, reducing battery requirements for devices of users that have not yet arrived at the region or have departed.

Referring briefly to FIG. 4B, illustrated is a exemplary table of an embodiment of demographics comparison for comparative geofences. As shown, the monitoring service may maintain statistics for each subregion 400B-400D, including the number of devices (and accordingly users) in each subregion, as well as demographics information or ratios. For example, the monitoring service may determine, from stored user information or user profiles and/or information received in the notification, a gender ratio or percentage for a subregion, an average age or an age range, an average level of educational attainment, a majority preference of music, an average income level, or any other type and form of information. This information may be provided to devices to display to users, including devices of users who are considering visiting the region or subregion. For example, a user may utilize a user interface of a device to select an event or venue to attend, responsive to their preference regarding displayed demographic information about each event or venue.

Figure 5:
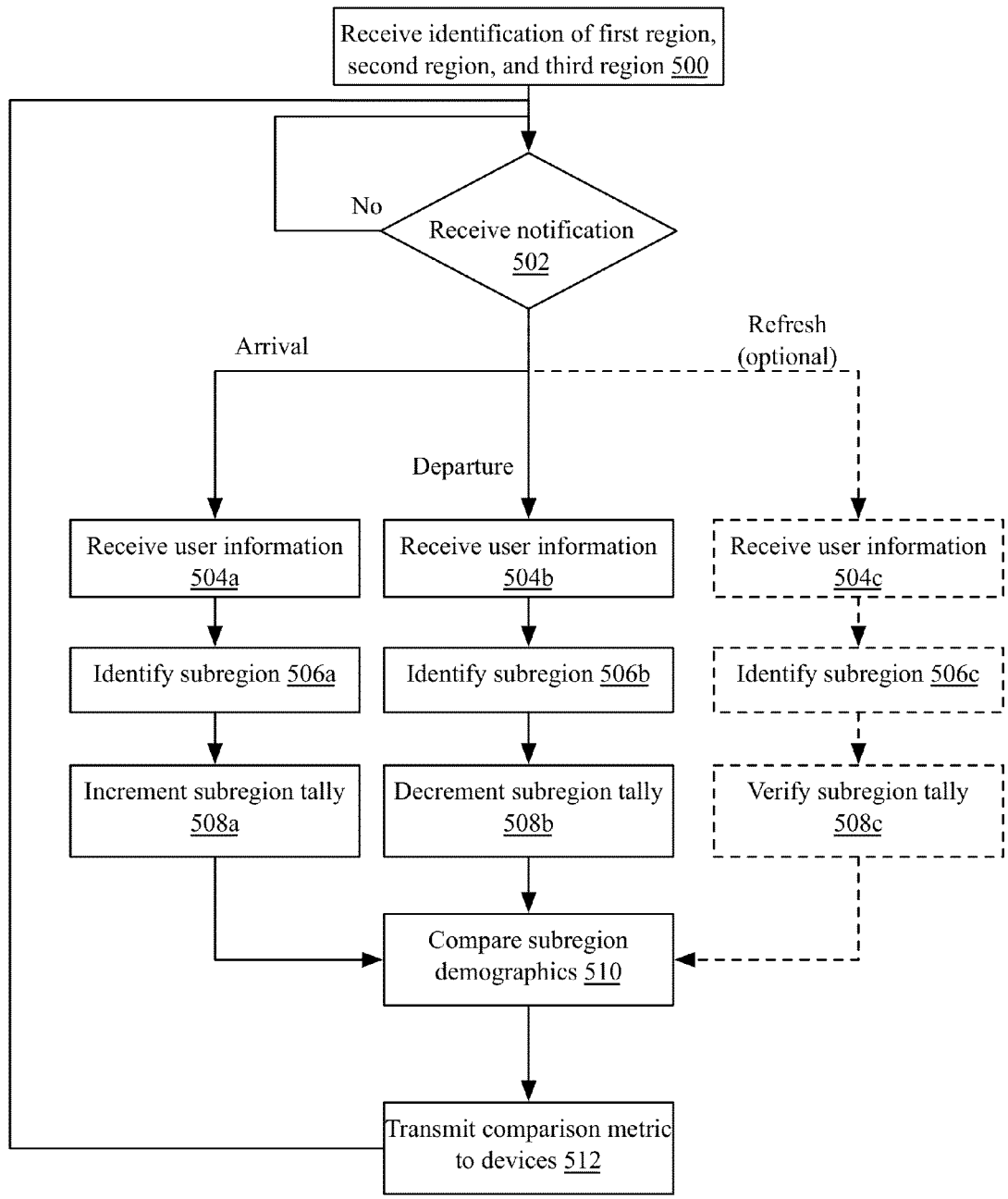
FIG. 5 is a flow chart of an embodiment of a method for comparative geofencing and demographics tracking.

FIG. 5 is a flow chart of an embodiment of a method for comparative geofencing and demographics tracking. In brief overview, at step 500, a geolocation monitoring service, such as one executed by a computing device 220 or server farm or cloud of computing devices, may receive an identification of a region and a plurality of subregions of the region, such as a first region, a second region distinct from the first region, and a third region including the first region and second region. At step 502, the geolocation monitoring service may receive a notification from a device of arrival, departure, or an update or refreshed location, or may receive no notification. If the geolocation monitoring service receives no notification, then step 502 may repeat.

In some embodiments, if the geolocation monitoring service receives an arrival notification from a device, then at step 504a, the geolocation monitoring service may receive or retrieve user information. At step 506a, the geolocation monitoring service may identify a subregion (e.g. the first or second region) that the device is in, based on coordinates received in the notification. At step 508a, the geolocation monitoring service may increment a corresponding subregion tally.

If the geolocation monitoring service receives a departure notification from a device, then in some embodiments, and in a similar process to that discussed above, at step 504b, the geolocation monitoring service may receive or retrieve user information. At step 506b, the geolocation monitoring service may identify a subregion (e.g. the first or second region) that the device has left, based on cached or stored information from a previously received notification from the device. At step 508b, the geolocation monitoring service may decrement the corresponding subregion tally.

Optionally, in some embodiments (as shown in dashed line), the geolocation monitoring service may receive a refresh notification or updated location information from the device. At step 504c, the geolocation monitoring service may receive or retrieve user information. At step 506c, the geolocation monitoring service may identify a subregion (e.g. the first or second region) that the device is in, based on coordinates received in the notification and a subregion that the device was previously in, based on cached or stored information from a previously received notification from the device. At step 508c, the geolocation monitoring service may verify the corresponding subregion tally if the new subregion and previous subregion are the same, or may decrement a previous subregion tally and increment a new subregion tally, if the device has moved.

At step 510, the geolocation monitoring service may compare subregion demographics of the incremented or decremented subregion to other subregions, and at step 512, the geolocation monitoring service may transmit a comparison metric to one or more devices, including portable devices, web servers, or other devices.

Still referring to FIG. 5 and in more detail, at step 500, the geolocation monitoring service may receive an identification of a plurality of geofenced regions, such as a first region, a second region distinct from the first region, and a third region that overlaps or includes the first and second regions. The regions may be of any size and shape, and may be defined in various ways including paths, boundaries, radii, or as arbitrary shapes via a bitmap or data array. The geolocation monitoring service may receive the identification of regions from an administrator or operator of the service, or may receive the identification of regions from a user. For example, in one such embodiment, a user, such as a concert promoter, may create an event for the system, such as a local band performance, and may indicate that the event is occurring at a building at a particular street address. The geolocation monitoring service may interpret this as a geofenced region with coordinates centered on the address and a radius of a predetermined size, such as 20 meters. In another embodiment, the system may present a map to the user, and the user may draw or otherwise define a geofence region on the map. In some embodiments, the overall region or geofence that includes the other geofences may be dynamically generated by the geolocation monitoring service. For example, the region may be generated as a circle centered on a centroid of all of the other defined geofences, with a radius equal to the distance from the centroid to the farthest point within a subregion geofence. In many embodiments, the geolocation monitoring service may receive identification of the regions a significant time prior to step 502, for example, during configuration of the system or when setting up events.

At step 502, the geolocation monitoring service may receive a notification from a device. As discussed above, the notification may be of any type and form, such as an HTTP data packet comprising a GET or POST request. The notification may include parameters or data fields explicitly defining the notification as an arrival, departure, or update or refresh, or this status may be implicit. For example, the first notification received from a device may logically be an arrival notification, while a notification received from a device with coordinates outside of a region may logically be a departure notification. In some embodiments, the geolocation monitoring service may not receive update or refreshed notifications, to reduce battery and bandwidth requirements of the devices or reduce load on the geolocation monitoring service. Notifications may include device identifiers, user identifiers or names, device coordinates, IP addresses, profile identifiers, demographic information, flags indicating arrival, departure, or refresh, or any other type and form of information.

If the notification is an arrival notification, or if the notification is the first notification received from a device (e.g. if the geolocation monitoring service does not have the device identifier stored in a cache or data table corresponding to the region or a subregion), then at step 504a, the geolocation monitoring service may receive or retrieve user information. For example, in some embodiments, the geolocation monitoring service may receive user information in the notification, such as a user profile, user identifier, user demographic information, or any other such information. In other embodiments, the geolocation monitoring service may retrieve user information from a user profile in a database, or from a social network service, such as Facebook. In such embodiments, the notification may include a user identifier such as a user ID or account name, and the geolocation monitoring service may retrieve a profile for the corresponding account.

At step 506a, the geolocation monitoring service may identify a subregion or region that the device is in, responsive to coordinates in the notification. For example, the geolocation monitoring service may compare coordinates received in the notification to a plurality of geofence regions to determine which geofence the device is within. As discussed above, geofences may be overlapping, or an overall region may include one or more subregions. The geolocation monitoring service may identify the smallest subregion that contains the coordinates of the device in the notification.

At step 508a, in some embodiments, the geolocation monitoring service may increment a subregion tally for the identified subregion. The geolocation monitoring service may maintain a data record or records for each subregion, identifying a count of devices in the subregion, which may be incremented as devices arrive and decremented as devices leave. In some embodiments, the geolocation monitoring service may also update other demographic information about the subregion, including gender ratios, average ages or age ranges, or any other type and form of demographic information, as discussed above. The geolocation monitoring service may utilize information retrieved in a user profile at step 504a to update the subregion demographic record. To avoid computationally expensive recalculation, particularly with a large number of devices in a subregion, in some embodiments, a value and an associated parameter may be stored, such as an average age and a number of users, such that the average may be quickly updated by multiplying the previous average by the previous number of users, adding the new user's age to the result, and dividing by the new number of users.

In a similar process, if the notification is a departure notification, then the geolocation monitoring service may receive user information 504b. In some embodiments, the geolocation monitoring service may cache user information received or retrieved at step 504a when a device arrives or first notifies the geolocation monitoring service. The geolocation monitoring service may retrieve the cached user information at step 504b, reducing the requirement to re-retrieve the data from a social networking service or other external system.

At step 506b, the geolocation monitoring service may identify a subregion that the device has departed. As discussed above, the geolocation monitoring service may cache a previous notification from the device and/or an identification of the device as within a subregion. For example, in one embodiment, the geolocation monitoring service may maintain a table of user or device identifiers for each subregion. Upon receipt of a departure notification, the geolocation monitoring service may search the tables to find the corresponding device or user identifier in a subregion table. In other embodiments, the geolocation monitoring service may associate the device or user identifier with a subregion identifier. For example, the device or user identifier may be used as the index of a list or table, and have a corresponding entry with a data value associated with the subregion, such as a subregion identifier. This may allow for efficient determinations of region associations.

At step 508b, the geolocation monitoring service may decrement a tally associated with the identified subregion. In some embodiments, the geolocation monitoring service may update demographics of the region, such as updating a gender ratio or average age. As discussed above, in one embodiment, averages may be updated without requiring recalculation by storing the average along with a number of users parameter.

In some embodiments, devices may periodically send update or refresh notifications to the geolocation monitoring service. This may be done to indicate that the device has not powered off or stopped communicating, as, in some embodiments, if the geolocation monitoring service receives an arrival notification for a device but receives no further notifications from the device within a predetermined period of time or a record expiration time, the geolocation monitoring service may remove the device from the region list, assuming that the user has left without the device transmitting a departure notification. Expiration times may be quite long, such as one hour, four hours, or any other value. Update or refresh notifications may also be helpful for instances in which a user moves from one subregion to another without leaving the overall region, such as moving from one club to another club, both on the same street.

In some embodiments, the geolocation monitoring service may retrieve cached user information corresponding to the device or user identifier at step 504c. The geolocation monitoring service may identify at step 506c a previous subregion associated with the device, and may determine whether the device is still within the same subregion based on coordinates received in the notification. If so, then at step 508c, the geolocation monitoring service may update an expiration timer associated with the device, but need not update demographic information. If the device has moved to a different subregion, then at step 508c, the geolocation monitoring service may perform steps 508b and 508a for the previous and new subregion, respectively.

At step 510, in many embodiments, subregion demographics may be compared. The comparison may comprise identifying demographic differences between different subregions and ranking or ordering the subregions accordingly. For example, in one such embodiment, subregions may be ranked by gender ratios. Such rankings or orderings may be transmitted to the devices or other computing devices or used to update a website at step 512, allowing users and venue operators to make attendance or operational decisions dynamically based on real-time demographic data.

C. Embodiments of Exemplary Computing Devices

Figure 6:
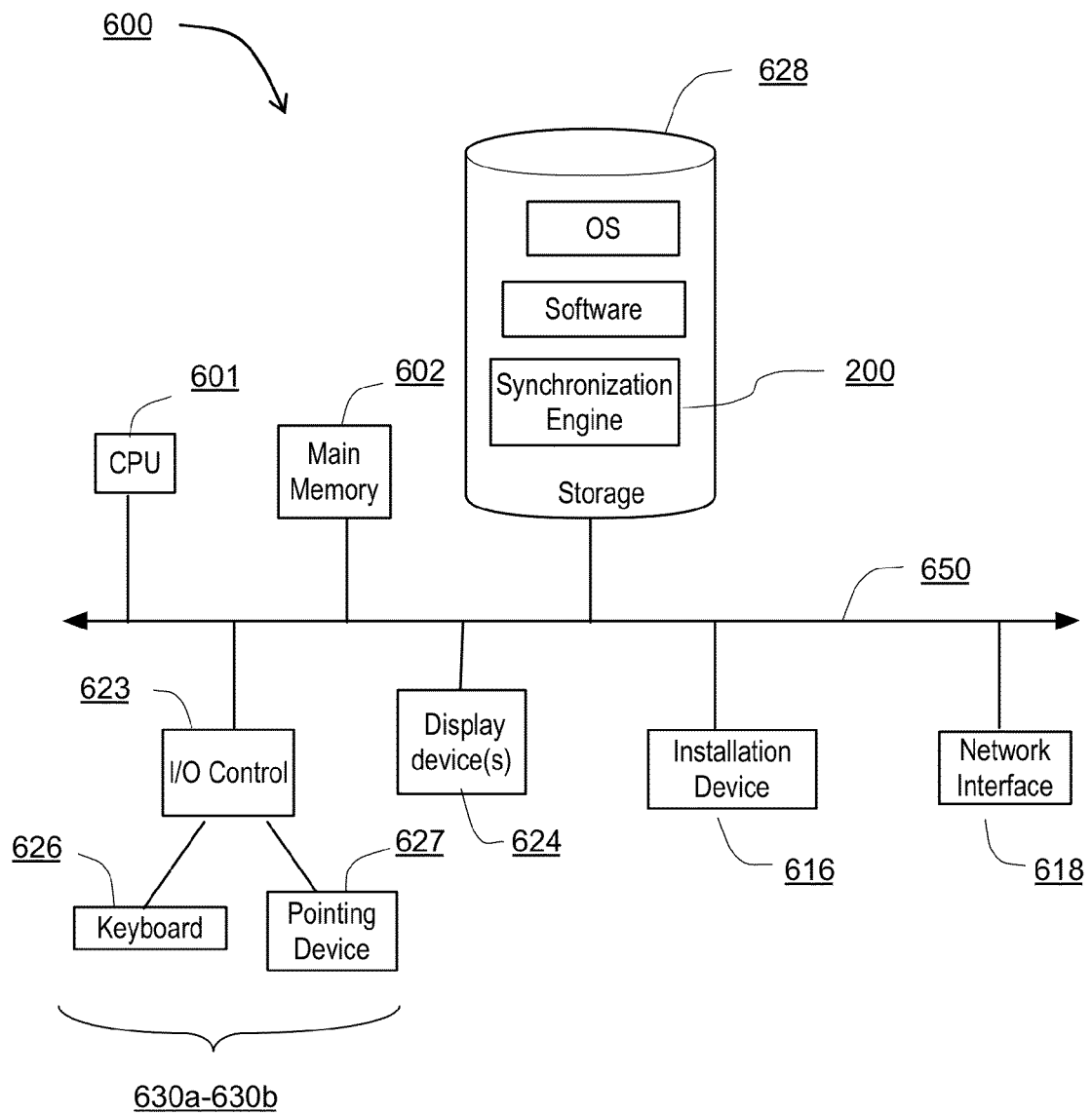
FIG. 6 is a block diagram of an exemplary computing device useful for practicing the methods and systems described herein.

FIG. 6 is a block diagram of an exemplary computing device useful for practicing the methods and systems described herein. The various devices 200, 220, may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 6 depicts a block diagram of a computing device 600 useful for practicing an embodiment of the devices 200, 220 or device of a social media provider or service in communication with a geolocation monitoring service 220. A computing device 600 may include a central processing unit 601; a main memory unit 602; a visual display device 624; one or more input/output devices 630a-630b (generally referred to using reference numeral 630), such as a keyboard 626, which may be a virtual keyboard or a physical keyboard, and/or a pointing device 627, such as a mouse, touchpad, or capacitive or resistive single- or multi-touch input device; and a cache memory 640 in communication with the central processing unit 601.

The central processing unit 601 is any logic circuitry that responds to and processes instructions fetched from the main memory unit 602 and/or storage 628. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 602 may be one or more memory chips capable of storing data and allowing any storage location to be directly accessed by the microprocessor 601, such as random access memory (RAM) of any type. In some embodiments, main memory unit 602 may include cache memory or other types of memory.

The computing device 600 may support any suitable installation device 616, such as a floppy disk drive, a CD-ROM drive, a CD-R/RW drive, a DVD-ROM drive, tape drives of various formats, USB/Flash devices, a hard-drive or any other device suitable for installing software and programs such as any client agent 620, or portion thereof. The computing device 600 may further comprise a storage device 628, such as one or more hard disk drives or redundant arrays of independent disks, for storing an operating system and other related software, and for storing application software programs such as any program related to the client agent 620.

Furthermore, the computing device 600 may include a network interface 618 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 618 may comprise a built-in network adapter, network interface card, PCMCIA network card, card bus network adapter, wireless network adapter, USB network adapter, cellular modem or any other device suitable for interfacing the computing device 600 to any type of network capable of communication and performing the operations described herein.

A wide variety of I/O devices 630a-630n may be present in the computing device 600. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 630 may be controlled by an I/O controller 623 as shown in FIG. 6. The I/O controller may control one or more I/O devices such as a keyboard 626 and a pointing device 627, e.g., a mouse, optical pen, or multi-touch screen. Furthermore, an I/O device may also provide storage 628 and/or an installation medium 616 for the computing device 600. The computing device 600 may provide USB connections to receive handheld USB storage devices such as the USB Flash Drive line of devices manufactured by Twintech Industry, Inc. of Los Alamitos, Calif.

The computing device 600 may comprise or be connected to multiple display devices 624a-624n, which each may be of the same or different type and/or form. As such, any of the I/O devices 630a-630n and/or the I/O controller 623 may comprise any type and/or form of suitable hardware, software embodied on a tangible medium, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. A video adapter may comprise multiple connectors to interface to multiple display devices 624a-624n. The computing device 600 may include multiple video adapters, with each video adapter connected to one or more of the display devices 624a-624n. Any portion of the operating system of the computing device 600 may be configured for using multiple displays 624a-624n. Additionally, one or more of the display devices 624a-624n may be provided by one or more other computing devices, such as computing devices 600a and 600b connected to the computing device 600, for example, via a network. These embodiments may include any type of software embodied on a tangible medium designed and constructed to use another computer's display device as a second display device 624a for the computing device 600. One ordinarily skilled in the art will recognize and appreciate the various ways and embodiments that a computing device 600 may be configured to have multiple display devices 624a-624n.

A computing device 600 of the sort depicted in FIG. 6 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 600 may have different processors, operating systems, and input devices consistent with the device. For example, in one embodiment, the computer 600 is an Apple iPhone or Motorola Droid smart phone, or an Apple iPad or Samsung Galaxy Tab tablet computer, incorporating multi-input touch screens. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

D. Exemplary User Interface

FIGS. 7A-7D are exemplary screenshots of an embodiment of a user interface for defining events and reviewing tracked demographics. The screenshots are provided merely to illustrate one potential design or embodiment of the user interface, and one of skill in the art may readily appreciate that other designs may be implemented.

Figure 7A:
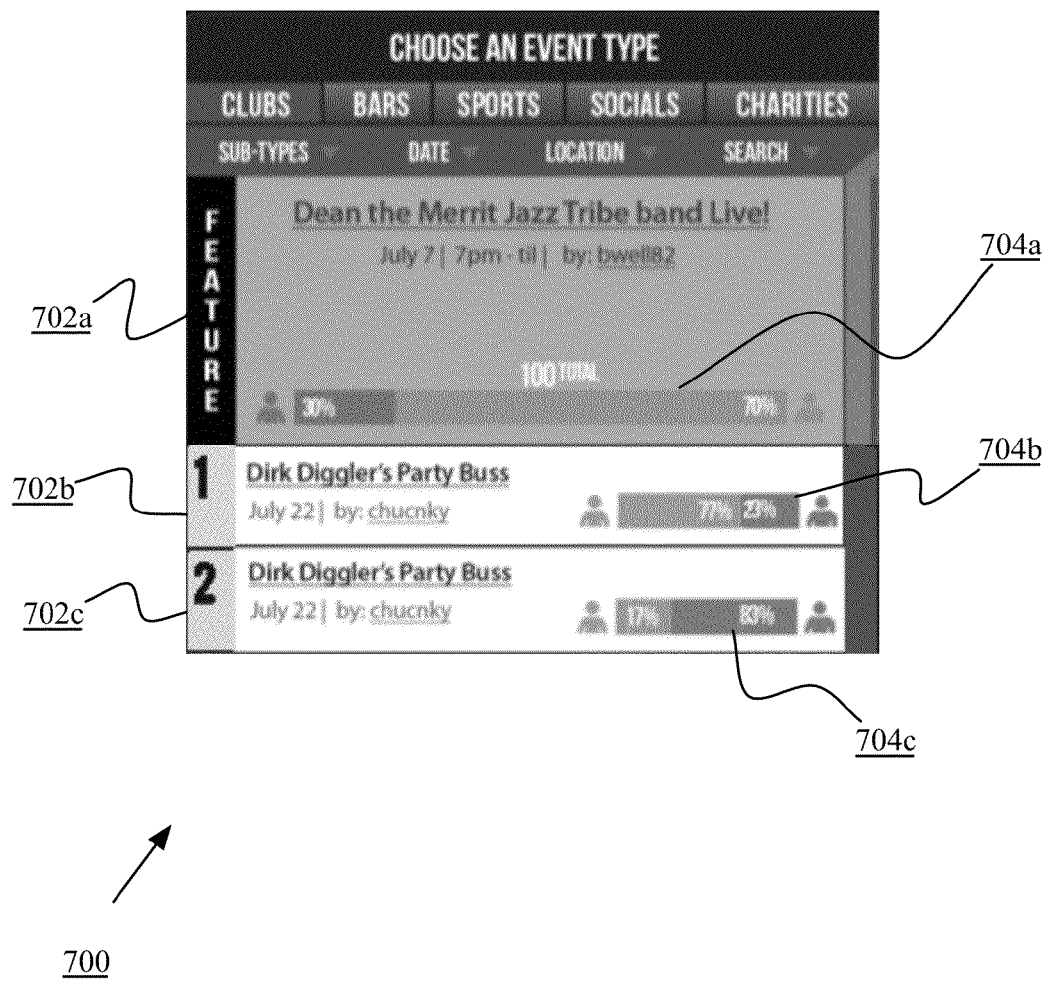
FIGS. 7A-7E are exemplary screenshots of an embodiment of a user interface for defining events and reviewing tracked demographics.

Referring first to FIG. 7A, shown is an exemplary screenshot of an embodiment of a user interface 700 for selecting an event and viewing demographic information. In some embodiments, the user interface 700 may be displayed to users via a smart phone or tablet application, while in other embodiments, the user interface 700 may be provided in a webpage or other interface. The user interface 700 may allow a user to select from multiple event types, subtypes, dates, locations, or search for a specific event. In some embodiments, the user interface 700 may show multiple events 702a-702c, including featured events or events for which an advertiser has paid a premium for highlighted placement within the user interface. Non-featured events may be ranked by distance from the device's current location, time to the event, amount of free spaces or unpurchased tickets, price, or any other metric. In some embodiments, demographic information 704a-704c may be shown, such as a gender ratio (shown in different shadings of gray, but more typically displayed in colors such as pink and blue, or associated with distinct icons).

Figure 7B:
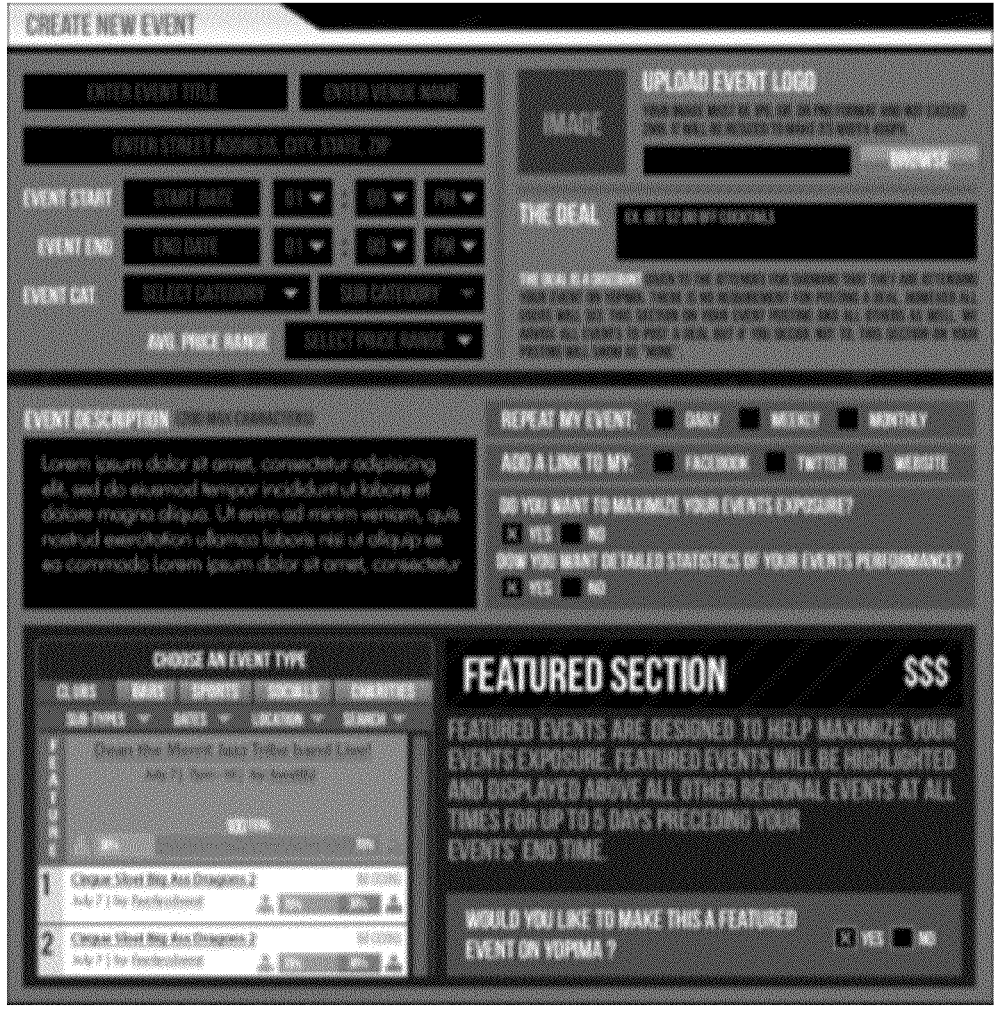
Figure 7C:
Figure 7D:

FIG. 7B is an exemplary screenshot of an embodiment of an interface 710 for creating an event. Venue operators or promoters may use the interface to define events for display and selection by users via interface 700. As shown, an operator may provide an event name, venue name, address, start and/or end time and date, category, subcategory, price range, logo, description, special offer for users of the system, or any other information. In some embodiments, the operator may select options for repeating the event, linking the event to social networking services or social media, adding additional advertising, or having the event appeared in a featured spot in interface 700.

In some embodiments, the operator may select to record detailed demographic information. As shown in the exemplary screenshot of FIG. 7C, the user interface 715 may allow an operator to purchase detailed attendance statistics of attendees or registered users for the event, including anticipated or actual, real-time data.

In some embodiments, an operator may be charged a fee to list an event. As shown in the exemplary screenshot of FIG. 7D, a user interface 720 may present a payment screen with a price dynamically calculated based on selected options, advertising selections, or other features.

Figure 7E:
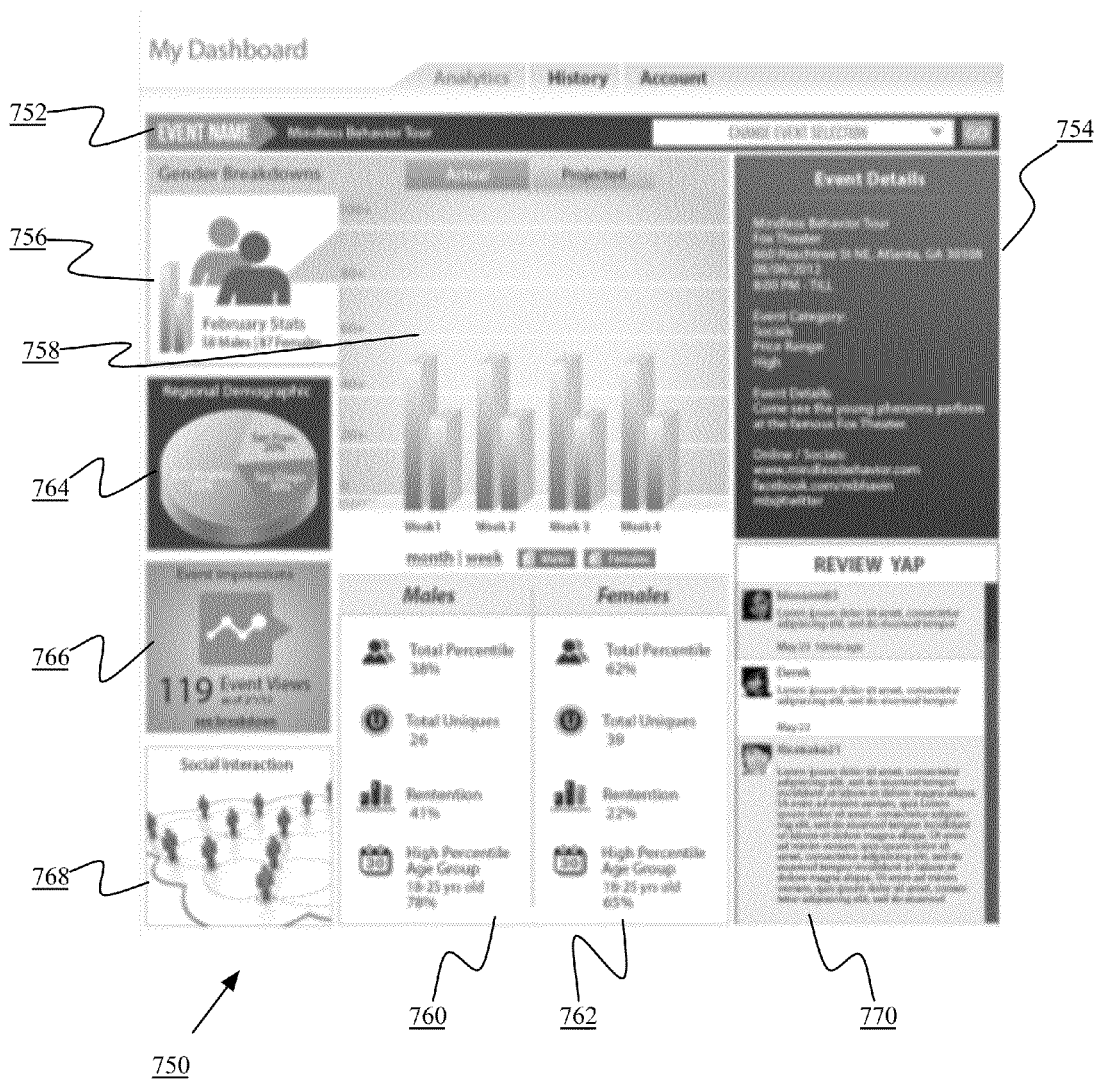

FIG. 7E is an exemplary screenshot of a dashboard user interface 750 for an operator of an event, displaying detailed demographic information for an event 752. Information about the event 754 may be displayed, along with demographic statistics 756-766. For example, the dashboard 750 may display gender ratios or numbers either in the aggregate 756, or by instance of an event, weekly, or monthly 758. The dashboard 750 may display further demographic information 760, 762, including the number of unique users, retention rates or how often users attend multiple events, age ranges or averages, or other such information. The dashboard 750 may also show regional demographic information 764, as well as how many users viewed the event or selected to receive additional information about the event. In some embodiments, the dashboard 750 may provide a link to social media discussions about the event 768 such as a Twitter hashtag or Facebook group, or may display reviews of the event 770.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for tracking locations of a plurality of devices within overlapping geofences, comprising:

receiving, by a location analyzer executed by a computing device, an identification of (i) a first region defined by a first geofence; (ii) a second region defined by a second geofence distinct from the first geofence; and (iii) a third region defined by a third geofence including the first region and second region;

receiving, by the location analyzer, a plurality of arrival notifications from a corresponding plurality of devices, each arrival notification sent by each device responsive to said device determining it has entered the third geofence;

receiving, by the location analyzer, user information for a user of each of the plurality of devices;

identifying, by the location analyzer, a first subset of the plurality of devices that are within the first region and a second subset of the plurality of devices that are within the second region;

comparing, by the location analyzer, user information of the users of the first subset of the plurality of devices and user information of the users of the second subset of the plurality of devices; and transmitting, by the location analyzer to a second computing device, a comparison metric identifying a difference between users of the first subset of the plurality of devices and users of the second subset of the plurality of devices.

2. The method of claim 1, wherein the first region and the second region do not overlap.

3. The method of claim 1, wherein each arrival notification is sent by each device further responsive to a current time being within a predetermined time period of a planned arrival time.

4. The method of claim 1, wherein each arrival notification comprises a geographic location of the corresponding device.

5. The method of claim 1, further comprising receiving, by the location analyzer, one or more current device locations from a corresponding one or more of the plurality of devices, sent by each device responsive to said device determining it is still within the third geofence.

6. The method of claim 5, further comprising:
re-identifying a first subset of the plurality of devices that are within the first region and a second subset of the plurality of devices that are within the second region based on the received one or more current device locations;

re-comparing, by the location analyzer, user information of the users of the first subset of the plurality of devices and user information of the users of the second subset of the plurality of devices; and transmitting, by the location analyzer to the second computing device, an updated comparison metric identifying a change in the difference between users of the first subset of the plurality of devices and users of the second subset of the plurality of devices.

7. A system for tracking locations of a plurality of devices within overlapping geofences, comprising:
a computing device comprising a processor executing a location analyzer configured for:
receiving an identification of (i) a first region defined by a first geofence; (ii) a second region defined by a second geofence distinct from the first geofence; and (iii) a third region defined by a third geofence including the first region and second region, receiving a plurality of arrival notifications from a corresponding plurality of devices, each arrival notification sent by each device responsive to said device determining it has entered the third geofence, receiving user information for a user of each of the plurality of devices, identifying a first subset of the plurality of devices that are within the first region and a second subset of the plurality of devices that are within the second region, comparing user information of the users of the first subset of the plurality of devices and user information of the users of the second subset of the plurality of devices, and transmitting, to a second computing device, a comparison metric identifying a difference between users of the first subset of the plurality of devices and users of the second subset of the plurality of devices.

8. The system of claim 7, wherein the first region and the second region do not overlap.

9. The system of claim 7, where each arrival notification is sent by each device further responsive to a current time being within a predetermined time period of a planned arrival time.

10. The system of claim 7, wherein each arrival notification comprises a geographic location of the corresponding device.

11. The system of claim 7, wherein the location analyzer is further configured for receiving one or more current device locations from a corresponding one or more of the plurality of devices, sent by each device responsive to said device determining it is still within the third geofence.

12. The system of claim 11, wherein the location analyzer is further configured for:
re-identifying a first subset of the plurality of devices that are within the first region and a second subset of the plurality of devices that are within the second region based on the received one or more current device locations, re-comparing user information of the users of the first subset of the plurality of devices and user information of the users of the second subset of the plurality of devices, and transmitting, to the second computing device, an updated comparison metric identifying a change in the difference between users of the first subset of the plurality of devices and users of the second subset of the plurality of devices.

13. A method for tracking locations of a plurality of devices within overlapping geofences, comprising:
receiving, by a portable computing device, an identification of a first geofence defining a first region;

determining a current location of the portable computing device;

comparing the current location of the portable computing device to the identified first geofence; and transmitting, by the portable computing device to a second computing device, an arrival notification, responsive to determining that the current location of the portable computing device is within the identified first region, the arrival notification including an identification of the current location of the portable computing device within one of a plurality of subregions of the first region defined by a corresponding plurality of geofences.

14. The method of claim 13, further comprising:
receiving, by the portable computing device from the second computing device, an identification of one or more users of other portable computing devices within the same one of the plurality of subregions of the first region as the portable computing device.

15. The method of claim 14, wherein the identification of the one or more users of other portable computing devices comprises an identification of a gender ratio of the one or more users within the same one of the plurality of subregions.

16. The method of claim 13, further comprising:
transmitting a current location of the portable computing device to the second computing device, at a predetermined frequency, until the portable computing device determines that the current location of the portable computing device is no longer within the identified first region.

17. The method of claim 13, further comprising:
transmitting a current location of the portable computing device to the second computing device, at a predetermined frequency, until expiration of a predetermined time period.

18. The method of claim 13, further comprising:
receiving, by the portable computing device, an identification of a planned arrival time;
identifying, by the portable computing device, that a current time is within a predetermined period of time before the planned arrival time; and
wherein determining a current location of the portable computing device is performed responsive to the identification that the current time is within the predetermined time period before the planned arrival time.

19. The method of claim 18, further comprising, prior to transmitting the arrival notification, repeating determining the current location of the portable computing device and comparing the current location of the portable computing device to the identified first geofence at a predetermined frequency, responsive to determining that the current location of the portable computing device is outside of the identified first region.

20. The method of claim 13, wherein the arrival notification includes an identification of a user of the portable computing device.

\* \* \* \* \*